(12) United States Patent
Facciano et al.

(10) Patent No.: US 9,534,563 B2
(45) Date of Patent: Jan. 3, 2017

(54) CLUSTER ROCKET MOTOR BOOSTERS

(71) Applicant: Raytheon Company, Waltham, MA (US)

(72) Inventors: Andrew B Facciano, Tucson, AZ (US); Juan Gonzalez, Tucson, AZ (US); Robert T Moore, Tucson, AZ (US); Michael S Alkema, Sahuarita, AZ (US)

(73) Assignee: Raytheon Company, Waltham, MA (US)

( * ) Notice: Subject to any disclaimer, the term of this patent is extended or adjusted under 35 U.S.C. 154(b) by 363 days.

(21) Appl. No.: 14/100,362

(22) Filed: Dec. 9, 2013

(65) Prior Publication Data

US 2015/0159587 A1    Jun. 11, 2015

(51) Int. Cl.
| | |
|---|---|
| *B64G 1/40* | (2006.01) |
| *B64G 1/64* | (2006.01) |
| *F02K 9/76* | (2006.01) |
| *F42B 15/12* | (2006.01) |
| *F42B 15/36* | (2006.01) |
| *F41F 3/04* | (2006.01) |
| *B64G 1/00* | (2006.01) |

(52) U.S. Cl.
CPC ............... *F02K 9/76* (2013.01); *B64G 1/002* (2013.01); *B64G 1/64* (2013.01); *B64G 1/641* (2013.01); *F41F 3/04* (2013.01); *F42B 15/12* (2013.01); *F42B 15/36* (2013.01); *B64G 1/403* (2013.01); *F02K 9/763* (2013.01)

(58) Field of Classification Search
CPC ............ B64G 1/002; B64G 1/40; B64G 1/64; B64G 1/641; B64G 1/645; B64G 1/403; F42B 15/00; F42B 15/10; F42B 15/12; F42B 15/36; F42B 15/38; F02K 9/76; F02K 9/763; F02K 9/766
See application file for complete search history.

(56) References Cited

U.S. PATENT DOCUMENTS

| | | | | |
|---|---|---|---|---|
| 4,834,324 A | * | 5/1989 | Criswell | B64G 1/002 244/158.9 |
| 5,218,165 A | * | 6/1993 | Cornelius | F42B 15/36 102/378 |
| 6,036,144 A | * | 3/2000 | Sisk | B64G 1/002 244/171.1 |
| 7,530,532 B2 | * | 5/2009 | Watts | B64G 1/002 244/171.3 |
| 7,578,482 B2 | * | 8/2009 | Duden | B64G 1/002 244/173.1 |
| 2005/0115439 A1 | * | 6/2005 | Abel | F02K 9/12 102/288 |
| 2007/0018033 A1 | * | 1/2007 | Fanucci | F42B 10/143 244/3.27 |

(Continued)

FOREIGN PATENT DOCUMENTS

| | | | | |
|---|---|---|---|---|
| RU | 2043956 C1 | * | 9/1995 | ............ B64G 1/401 |
| RU | 2068378 C1 | * | 10/1996 | ............ B64G 1/002 |

*Primary Examiner* — Tien Dinh
*Assistant Examiner* — Richard R Green
(74) *Attorney, Agent, or Firm* — Renner, Otto, Boisselle & Sklar, LLP (57) ABSTRACT

A projectile for firing from a launcher includes a propulsion stage having non-axisymmetric boosters arranged about a longitudinal axis of the propulsion stage. The propulsion stage may further include a central booster about which the non-axisymmetric boosters are arranged.

19 Claims, 10 Drawing Sheets

(56) References Cited

U.S. PATENT DOCUMENTS

2010/0242772 A1\* 9/2010 Martineau .............. B64G 1/002
                                                     244/63
2012/0042628 A1\* 2/2012 Rosheim .............. B25J 17/0266
                                                     60/232

\* cited by examiner

CLUSTER ROCKET MOTOR BOOSTERS

FIELD OF INVENTION

The present invention relates generally to a projectile, and more particularly to a propulsion system of a projectile.

BACKGROUND

Ballistic missiles often include a flight vehicle and at least one propulsion stage coupled to the flight vehicle. Such ballistic missiles are often stored in a launch canister for loading into a launch tube of a launch system, or a launcher. A "round," a launch canister and a ballistic missile, often has a specific and inflexible weight requirement resulting from "load-out" capabilities of the launch system or of the armament or vehicle where the launch system is located, such as on a warship. The round weight requirement is divided between the launch canister and the ballistic missile. The weight of the ballistic missile is driven by the amount of propellant and necessary componentry, such as actuators, while the weight of the launch canister is driven by the requirement for a thick and heavy launch canister developed to provide compensation for over-pressurization during missile launch or to restrain fire loads during a "hang-fire" or an accidental ignition.

The propulsion stage enables egress from a launch canister and launch system, movement away from the launch system, and movement towards a target. Use of a propulsion stage having multiple or clustered motor boosters enables additional control of such egress and movement. However, use of multiple boosters causes enlargement of an external profile of the propulsion stage, requiring additional propellant for launch and other maneuvers, thereby increasing the weight of the projectile. Accordingly, there is a need for a projectile having a propulsion stage with multiple motor boosters that enables a balance between the projectile's external profile and the total round weight.

SUMMARY OF INVENTION

According to one aspect of the invention, a projectile for firing from a launcher includes a propulsion stage having non-axisymmetric boosters arranged about a longitudinal axis of the propulsion stage. The propulsion stage may include a central booster about which the non-axisymmetric boosters are arranged. The central booster may be axisymmetric.

The non-axisymmetric boosters may each have a booster outer wall, and the booster outer walls may each include an arcuate wall portion of the respective booster outer wall corresponding to a curvature of the central booster. The non-axisymmetric boosters may each have a booster outer wall, and the booster outer walls may each include a planar wall portion. The non-axisymmetric boosters may abut one another at the planar wall portions.

The propulsion stage may further include a binding material wrapped about the non-axisymmetric boosters. A projectile system may include the projectile and a projectile outer launch canister, where the projectile is at least partially interior to the projectile outer launch canister.

According to another aspect of the invention, a propulsion stage includes contiguous boosters arranged about a longitudinal axis of the propulsion stage, and a binding material wrapped about the non-axisymmetric boosters, where at least one of the contiguous boosters is non-axisymmetric. Longitudinally-extending portions of each of the contiguous boosters may be integral parts of a unitary body of boosters. Longitudinally-extending portions of each of the contiguous boosters may be single continuous edgeless tubes. The contiguous boosters may define a central cavity therebetween with structural reinforcement material filling most of the cavity. The contiguous boosters may include an axisymmetric primary booster and non-axisymmetric boosters arranged about the primary booster.

Each of the non-axisymmetric boosters may have two substantially planar surfaces, where each of the non-axisymmetric boosters is operatively coupled to adjacent of the non-axisymmetric boosters at the substantially planar surfaces. The primary booster may be substantially cylindrical, and each of the non-axisymmetric boosters may have a concave curved surface corresponding to and contiguous with the substantially cylindrical primary booster.

The propulsion stage may further include wherein four non-axisymmetric boosters are arranged about the longitudinal axis. The propulsion stage may further include deployable airbags each mounted between two of the contiguous boosters.

The propulsion stage may further include nozzles, and an actuation system coupled to one nozzle for moving the one nozzle, with the one nozzle operatively coupled to additional nozzles for moving the additional nozzles. The primary booster and the non-axisymmetric boosters may define cavities therebetween with structural reinforcement material filling most of each of the cavities.

According to a further aspect of the invention, a method of deploying a projectile from a launcher includes the steps of igniting a propellant in a central booster of the projectile, thereby enabling egress of the projectile from the launcher, igniting a propellant in non-axisymmetric peripheral boosters of the projectile abutting the central booster prior to exhaustion of the propellant in the central booster, thereby enabling propulsion of the projectile away from the launcher and towards a target. The method may further include the step of deploying inflatable airbags mounted between non-axisymmetric peripheral boosters, thereby enabling a propulsion stage including the central booster, non-axisymmetric boosters, and airbags to separate from a remainder of the projectile.

The foregoing and other features of the invention are hereinafter described in greater detail with reference to the accompanying drawings.

DETAILED DESCRIPTION

A projectile includes a propulsion stage having non-axisymmetric boosters arranged about a longitudinal axis of the propulsion stage. The propulsion stage may further include a central booster about which the non-axisymmetric boosters are arranged. The projectile may be a missile, interceptor, guided projectile, or unguided projectile, and thus will be described below chiefly in this context. The invention may also be useful in other applications including pyrotechnics, satellites, sub-munitions, and other booster-propelled projectiles.

Figure 1:
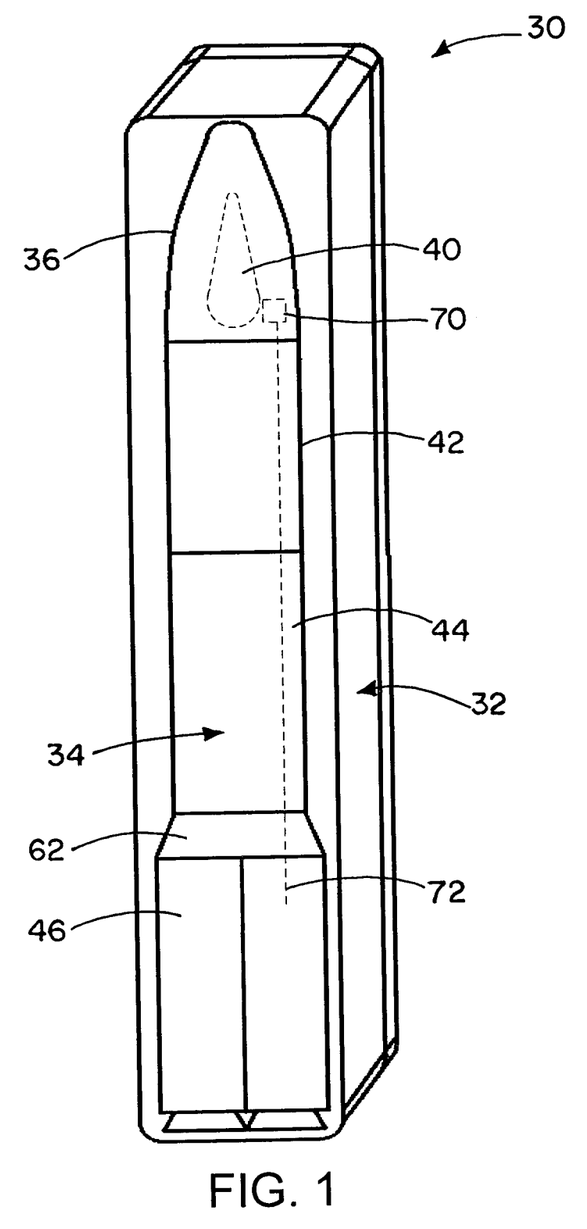
FIG. 1 is a cutaway view of an exemplary projectile system.
Figure 2:
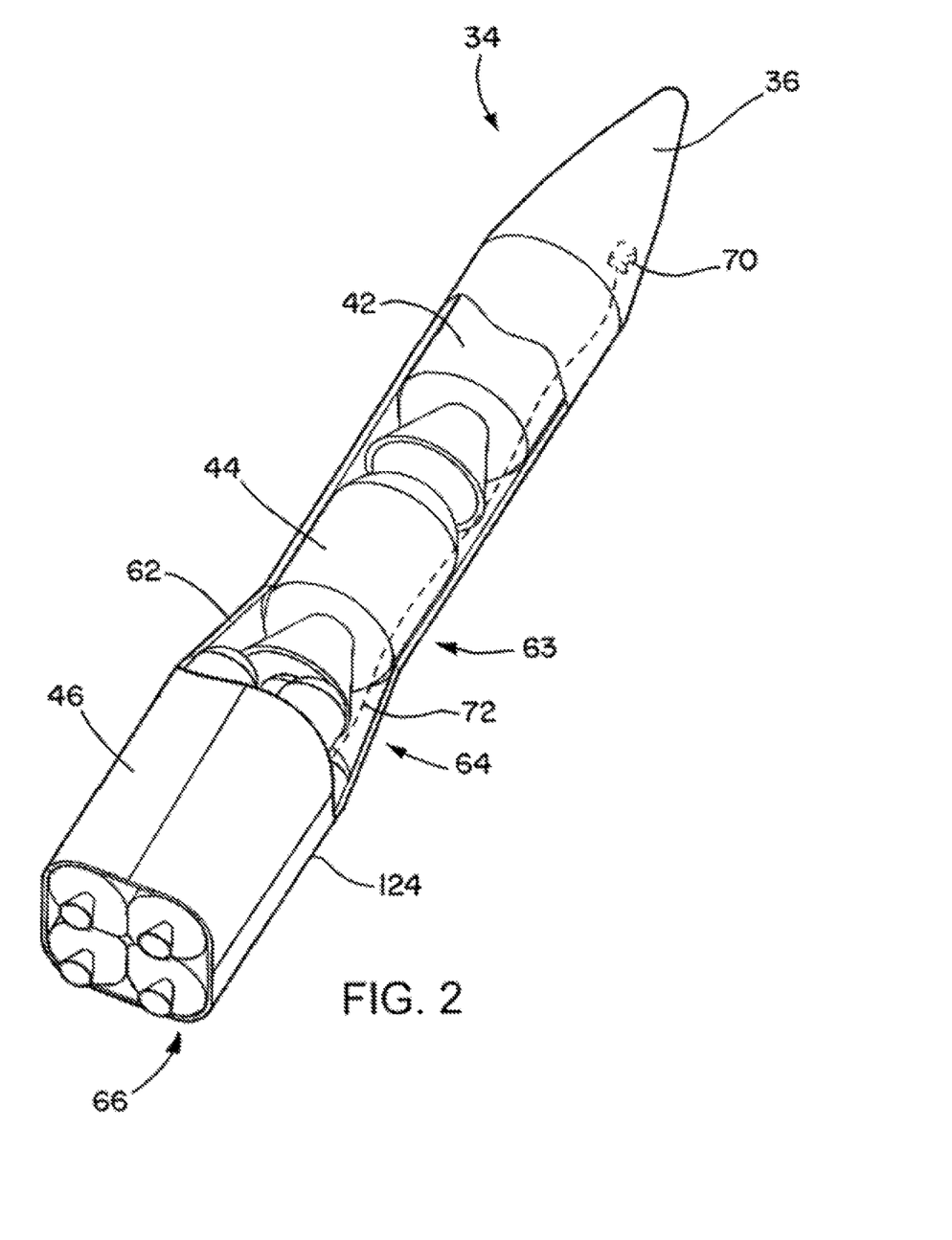
FIG. 2 is a partial cutaway view of the exemplary projectile of FIG. 1.

Referring now in detail to the drawings and initially to FIGS. 1 and 2, an exemplary projectile system 30 according to the invention and for loading into a launcher is shown. The projectile system 30 includes an outer launch canister 32 for housing or storing a projectile 34 to be fired from the canister 32. The projectile 34 is positioned completely interior to the launch canister 32, although it will be appreciated that the projectile 34 may instead be positioned only partially interior to the launch canister 32.

The launch canister 32 generally has a square-shaped lateral profile, having four equal length sides and rounded corners, and a rectangular longitudinal profile, having two unequal length pairs of equal length sides and rounded corners, though it will be appreciated that the profiles may be of any suitable shape. Due to standard development specifications, launch canisters generally have a square-shaped lateral profile for corresponding to a respective launcher.

The projectile 34 includes a nosecone 36 for housing a flight vehicle 40, such as a warhead, explosive, payload, sub-projectile, sensor array, or other package. Three propulsion stages are coupled adjacent the nosecone 36 for storing propellant to be ignited to provide propulsion, although it will be appreciated that any suitable number of propulsion stages may be utilized. The propulsion stages include an upper propulsion stage 42, an intermediate propulsion stage 44, and a lower propulsion stage 46 adjacent the nosecone 36. The propulsion stages 42, 44, and 46 are stacked longitudinally in that order for being ignited in an opposite order.

The propulsion stages 42, 44, and 46 contain propellant enclosed therein, such as solid, liquid, or gaseous propellant, or a combination thereof. Each of the propulsion stages 42, 44, and 46 may include the same propellant as, or a propellant different from, any other of the propulsion stages 42, 44, and 46.

The upper and intermediate propulsion stages 42 and 44 are generally cylindrical, though they may be of any suitable shape. By contrast with purely cylindrical projectiles, the lower propulsion stage 46 has a substantially square-shaped lateral profile corresponding to the square-shaped lateral profile of the launch canister 32, thereby making effective use of the internal volume of the launch canister 32 and allowing for additional propellant volume to be stored in the lower propulsion stage 46.

The propulsion stages 42 and 44 may also include flanges, such as flange 62, for coupling propulsion stages to one another. The flange 62 is integral with, such as attached to, the propulsion stages 44 and 46. As shown, the flange 62 surrounds the intermediary propulsion stage 44, and extends between a rear end 63 of the intermediary propulsion stage 44 and a forward end 64 of the lower propulsion stage 46. Thus, the flange 62 provides an extension of the propulsion stage 44, thereby providing structure to enable coupling, such as by a ring and groove joint, of the intermediary propulsion stage 44 to the lower propulsion stage 46.

The projectile 34 may further include a guidance and control system, such as a controller 70, located in the nosecone 36, included in the flight vehicle 40, or otherwise included in another suitable location of the projectile 34. The controller 70 is communicatively coupled to the propulsion stages 42, 44, and 46 for controlling timing of ignition of the propellant within the stages and for directing the projectile 34 towards a desired destination. The controller 70 may utilize a variety of different data in order to direct the projectile 34. As an example, the desired destination of the projectile 34 may be a location of a target, and more specifically, a continually changing location of a moving target, such as a ballistic missile.

A communications connection 72, such as a wire or fiber optic cable, extends longitudinally along the projectile 34 between the controller 70 and the lower propulsion stage 46, thereby allowing communication therebetween. Alternatively, the projectile 34 may also include additional communications connections, or the communications connection 72 may be omitted and communication may instead be wireless or of any other suitable type.

Figure 3:
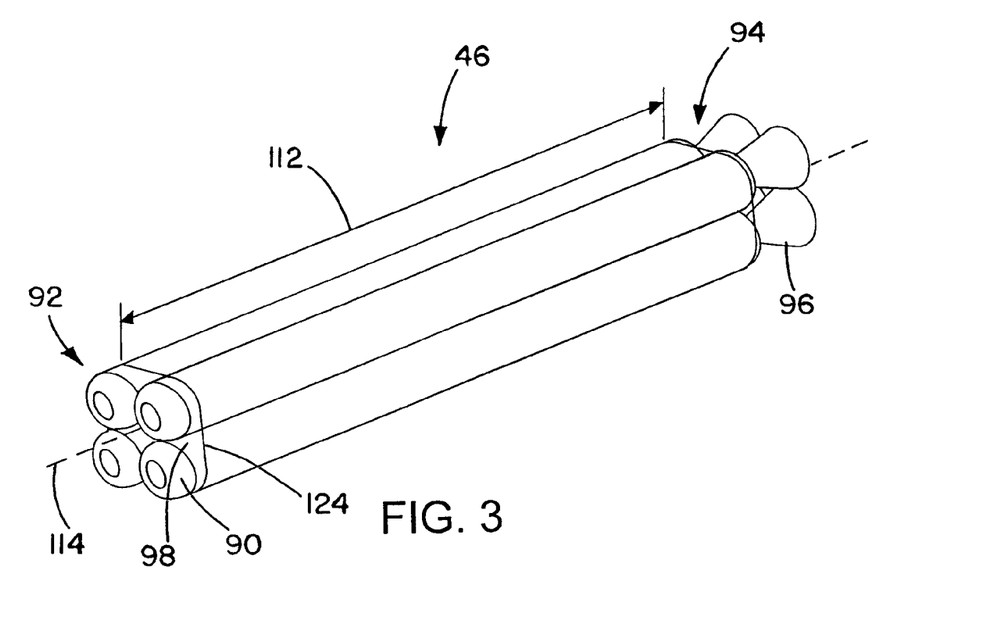
FIG. 3 is an oblique view of an exemplary propulsion stage of the projectile of FIG. 1.

Turning now to FIG. 3, and in contrast to lower propulsion stages of typical projectiles, the propulsion stage 46 includes a plurality of motor boosters 90 having the propellant disposed internally therein. As shown, the propulsion stage 46 includes four boosters 90, though any suitable number of boosters 90 may be included.

The boosters 90 extend longitudinally between a forward end 92 of the boosters 90, at the forward end 64 of the lower propulsion stage 46, and a rear end 94 of the boosters 90, at a rear end 66 of the lower propulsion stage 46. Mechanically engaged or otherwise coupled to the rear end 94 of the boosters 90 is at least one nozzle 96 for directing plume and thrust created by burning propellant. As shown, the lower propulsion stage 46 includes one nozzle 96 coupled to the aft or rear end 94 of each booster 90, though it will be appreciated that any number of nozzles may be included. For example, structure may be included, coupled between the boosters 90 and the nozzles 96, for directing the plume and thrust of numerous boosters 90 into a single nozzle 96, or for directing the plume and thrust of a single booster 90 into multiple nozzles 96.

Provision of more than one booster may allow for a reduced thickness of booster outer walls 98 and of the associated launch canister 32. Reducing the thickness, and thus also the weight, of the canister 32 and/or walls 98 may be permissible due to lesser development requirements than that of a propulsion stage having a single, large booster. The lesser development requirements may include containment of a lesser over-pressurization load created during launch and/or protection against a lesser reaction caused by a "hang-fire" or accidental ignition. Accordingly, based upon a weight reduction of the associated launch canister 32, propellant weight may be increased allowing for inclusion of the multiple motor boosters 90.

The boosters 90 may also include more propellant volume than that of a single, large booster, allowing for greater projectile maneuverability and longer flight distance. The additional volume may be enabled via more effective use of the otherwise wasted area interior to the launch canister 32, and located between the launch canister 32 and the walls 98.

The additional propellant volume of the plurality of boosters 90 may in turn allow the projectile 34 to compensate for and to overcome increased aerodynamic instability due in part to the inclusion of the additional propellant volume. Particularly, the increased aerodynamic instability may result from the lower propulsion stage 46 having an outer profile extending beyond that of the remainder of the projectile. This outer profile is a result of increasing the propellant volume and providing a plurality of boosters 90, which is in turn enabled both by minimizing the otherwise wasted area and by providing for a lower propulsion stage 46 having a square-shaped lateral profile.

Figure 4:
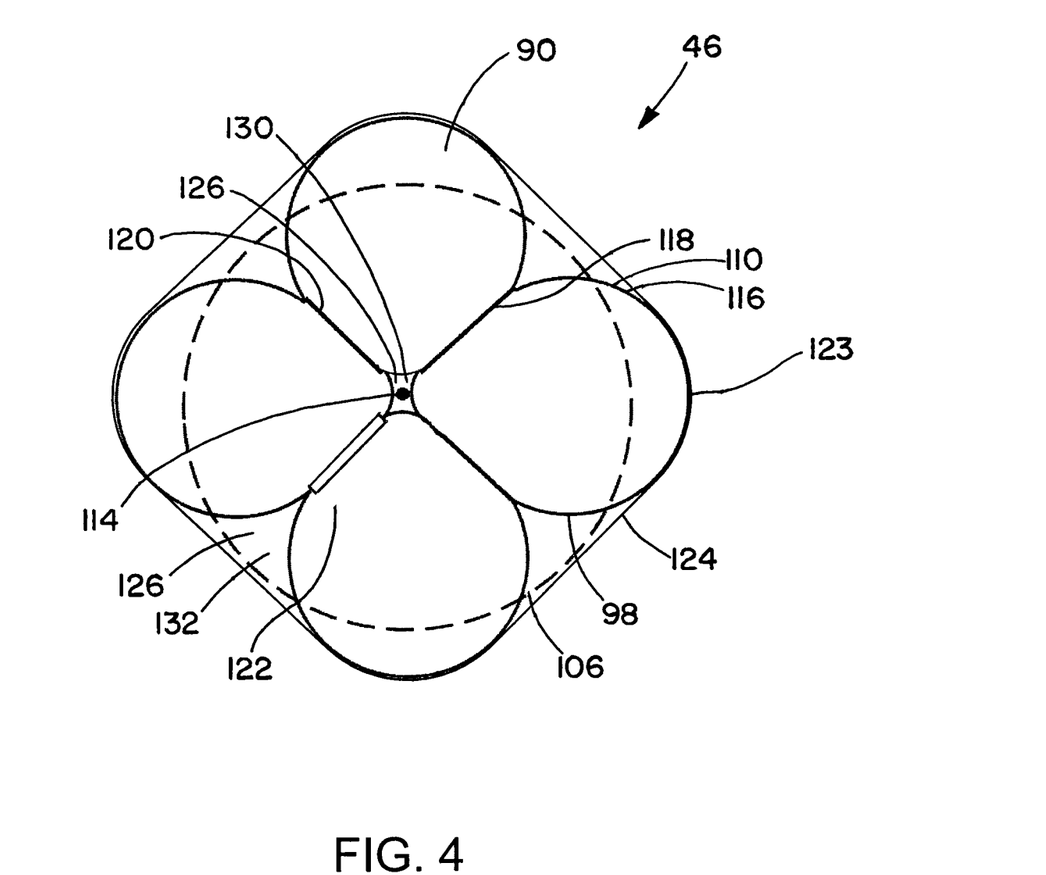
FIG. 4 is an enlarged cross-sectional view illustrating a cross-section of the projectile of FIG. 1.

An exemplary configuration of the boosters 90 for maximizing propellant storage volume is shown in FIGS. 3 and 4. The boosters 90 are contiguous with one another, which may include contact between the boosters 90, or close proximity without actual contact. The boosters 90 include four non-axisymmetric boosters 110, where a non-axisymmetric shape allows for better use of space internal to the boosters 110, as compared to a single, large, cylindrical booster shown at the phantom line 106. The boosters 110 have longitudinally-extending portions 112, located between the forward and rear ends 92 and 94 of the non-axisymmetric boosters 110. The longitudinally-extending portion 112 of each of the non-axisymmetric boosters 110 may be a single, continuous edgeless tube, without sharp edges, which are often locations of extreme stress concentration during launch and subsequent flight maneuvers. While four non-axisymmetric boosters 110 are included in the lower propulsion stage 46, any suitable number may be included.

The non-axisymmetric boosters 110 are arranged about a central longitudinal axis 114 of the lower propulsion stage 46. This arrangement provides the lower propulsions stage 46 with a substantially cloverleaf-shaped lateral profile. The boosters 110 may also be arranged about any other suitable axis of the lower propulsion stage 46. The boosters 110 have booster outer walls 116 having substantially planar wall portions 118 that may be touching or abutting. The planar wall portions 118 may be coupled or adjoined, such as by adhesives, welding, fusing, mechanical interlocking, or other method of coupling. Accordingly, external substantially-planar surfaces 120 of the planar wall portions 118 of booster outer walls 116 adjacent one another may be operatively coupled at the planar surfaces 120. Alternatively, the planar wall portions 118 may be spaced apart from one another by one or more spacers, such as blade stiffeners 122, which may or may not be coupled to or adjoined to the planar wall portions 118.

Further, at least the longitudinally-extending portions 112 may be integral parts of a unitary body 123 of boosters. The body 123 may be formed via extrusion, pultrusion, or another suitable manufacturing process. In this way, the non-axisymmetric boosters 110 abutting one another may share common planar wall portions 118. The common planar wall portions 118 may have increased thickness as compared to non-common wall portions, thereby providing increased structural support.

Additionally, the body 123 may be symmetric across symmetric planes longitudinally bisecting the propulsion stage 46 and extending longitudinally between the forward and rear ends 92 and 94. In this way, there may be equal operating pressures internal to each of the non-axisymmetric boosters 110 and across common, shared, contiguous, adjoining, or coupled walls of the boosters 110, except in situations of momentary thrust burn variations.

The lower propulsion stage 46 may also include a binding material, such as an overwrap 124, wrapped or filament-wound about the contiguous non-axisymmetric boosters 110. The overwrap 124 may provide structural strength to the lower propulsion stage 46, and also may be used to join the boosters 110 together in a suitable configuration. The overwrap 124 may compress together the boosters 90, which may change the shape of a flexible booster, transferring flexible axisymmetric boosters into non-axisymmetric boosters 110.

Structural reinforcement material 126, such as foam, may be placed between adjacent of the boosters 90 and/or between the boosters 90 and overwrap 124, thereby providing additional structural support. Particularly, the reinforcement material 126 may fill at least part of, most of, or all of a central cavity 130, extending along the central longitudinal axis 114, and/or peripheral cavities 132, extending between the non-axisymmetric boosters 110 and the overwrap 124. As shown, the central cavity 130 is defined by and located between the boosters 110, and the peripheral cavities 132 are defined by and located between the boosters 110 and the overwrap 124. Alternatively, additional smaller boosters may be located in the central cavity 130 or the peripheral cavities 132.

Figure 5:
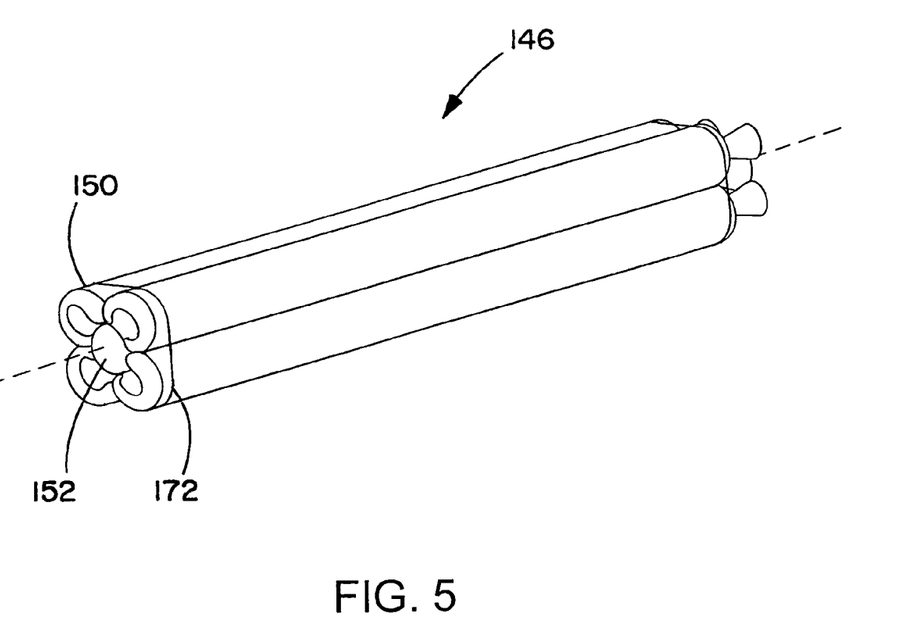
FIG. 5 is an oblique view of another exemplary propulsion stage of a projectile.
Figure 6:
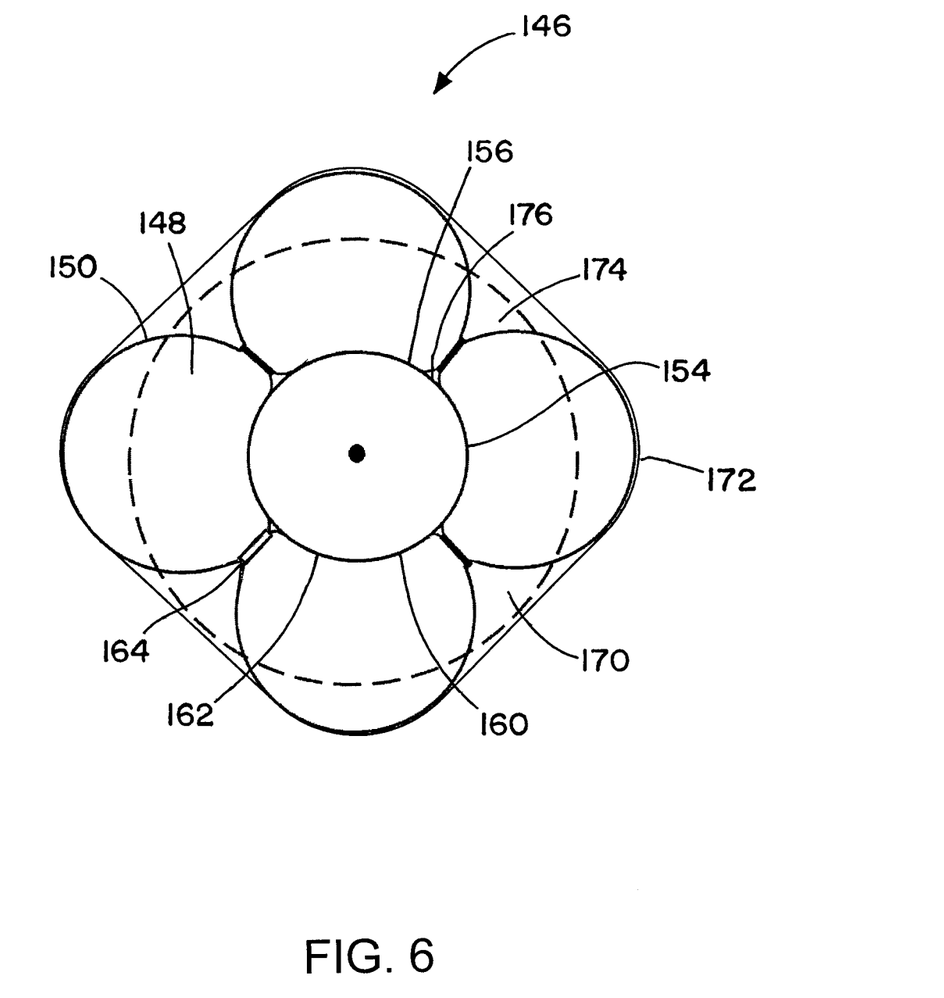
FIG. 6 is an enlarged cross-sectional view illustrating a cross-section of the propulsion stage of FIG. 5.

Turning now to FIGS. 5 and 6, another exemplary lower propulsion stage 146 is shown. The lower propulsion stage 146 may be used in place of the lower propulsion stage 46 (FIG. 2), and the discussion below omits many features of the lower propulsion stage 146 that are similar to those of the lower propulsion stage 46. In addition, features of the lower propulsion stage 146 may be combined with those of the lower propulsion stage 46.

The lower propulsion stage 146 includes a plurality of boosters 148, which includes a primary booster and peripheral boosters. The peripheral boosters, such as the non-axisymmetric boosters 150, are arranged about the primary booster, such as a central booster 152. The projectile may operate such that the primary or central booster 152 provides the initial launch burn before ignition of the surrounding peripheral boosters. The central booster 152 may also have a greater internal volume for storing a greater volume of propellant than any one of the non-axisymmetric boosters 150. In this way, the greatest thrust vector control loads may be experienced during launch while burning the central booster 152.

The central booster 152 may be substantially axisymmetric and substantially cylindrical, though alternatively the central booster 152 may be non-axisymmetric. Booster outer walls 154 of the non-axisymmetric boosters 150 may include arcuate wall portions 156 corresponding to a curvature of a booster outer wall 160 of the central booster 152. In the illustrated embodiment, each arcuate wall portion 156 has a concave curved surface 162 corresponding to and contiguous with the axisymmetric central booster 152. The outer walls 154 and 160 may be coupled, adjoined, spaced from one another, or spaced from one another via blade stiffeners 164 in a similar manner described with reference to the outer walls 116 (FIG. 4) of the lower propulsion stage 46 (FIG. 4).

Peripheral cavities 170 of the lower propulsion stage 146 are defined by the non-axisymmetric boosters 150 and the overwrap 172, and may be filled with structural reinforcement material 174, similar to the peripheral cavities 132 (FIG. 4) of the lower propulsion stage 46 (FIG. 4). Moreover, internal cavities 176, defined by both the non-axisymmetric boosters 150 and the central booster 152, may also be similarly filled with the structural reinforcement material 174.

Figure 7:
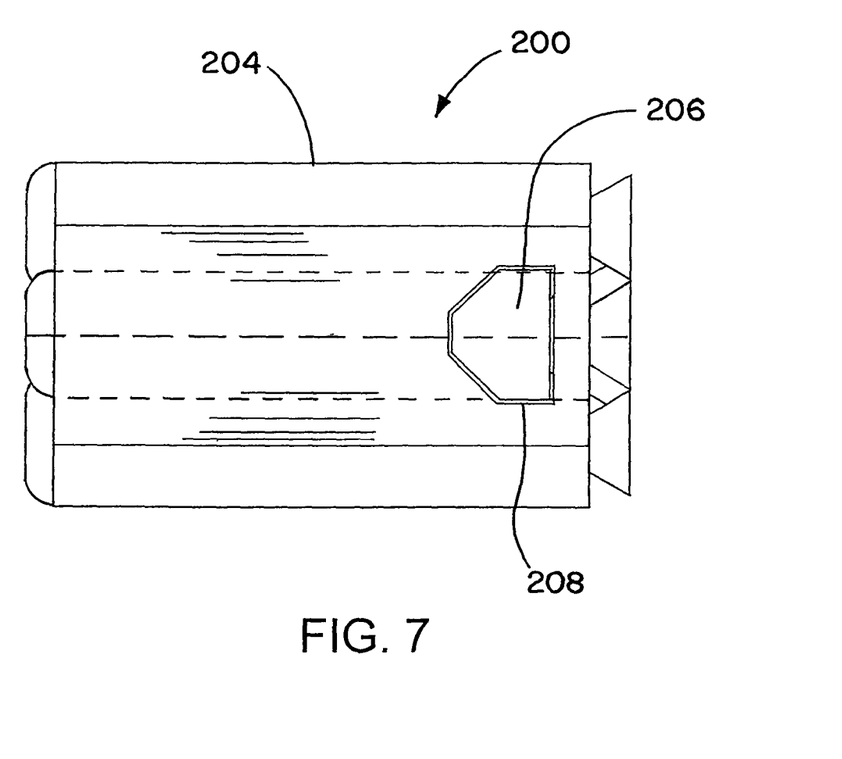
FIG. 7 is side view of yet another exemplary propulsion stage of a projectile.
Figure 8:
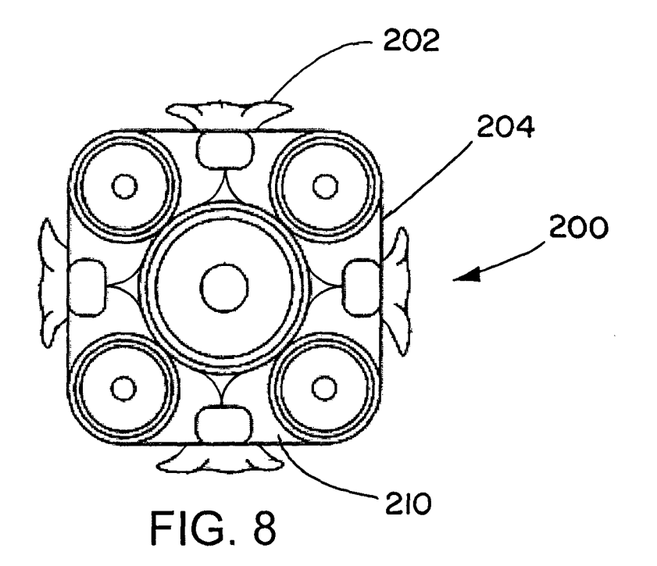
FIG. 8 is a rear view of the propulsion stage of FIG. 7.
Figure 9:
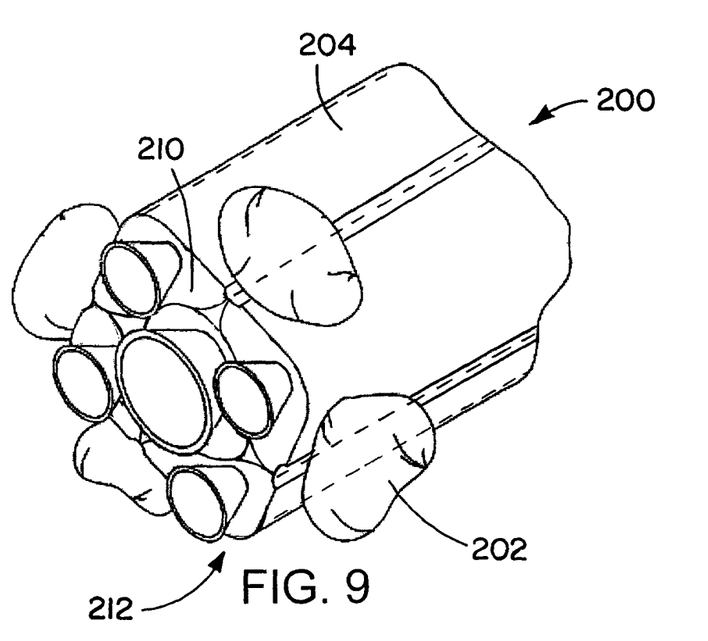
FIG. 9 is an oblique view of the propulsion stage of FIG. 7.

Turning now to FIGS. 7-9, another exemplary lower propulsion stage 200 is shown as including a plurality of deployable inflatable airbags 202 for ejecting or separating the lower propulsion stage 200 from a remainder of a projectile, such as after exhaustion of the propellant in a plurality of boosters of the lower propulsion stage 200. The propulsion stage 200 may be used in place of the lower propulsion stages 46 (FIG. 2) or 146 (FIG. 6), and the discussion below omits many features of the lower propulsion stage 200 that are similar to those of the lower propulsion stages 46 and 146. In addition, features of the lower propulsion stage 200 may be combined with those of the lower propulsion stages 46 and 146. Also, another propulsion stage may instead include the deployable airbags 202, and deployable inflatable corrosion resistant steel (CRES) airbags may be used for the airbags 202 due to their relatively low weight and cost as well as their ability to achieve aerodynamic stability in unstable aerodynamic environments. Alternatively, the airbags 202 may be made from a polymer or combination of corrosion resistant steel and polymer.

Each of the airbags 202 is mounted between at least two non-axisymmetric boosters 210. The deployable airbags 202 may be mounted internal to an overwrap 204, and adjacent doors 206, which are located in openings 208 in the overwrap 204. The doors 206 may be separable from the overwrap 204 upon inflation of and due to the force created by the inflation of the airbags 202. Alternatively, the doors 206 may remain connected to the overwrap, for example being coupled to the overwrap 204 via hinges or other suitable connection. The doors 206 also may be omitted entirely, with the openings 208 unobstructed.

Upon inflation of the deployable airbags 202 through the openings 208, drag on the lower propulsion stage 200 will be increased, thereby allowing for separation of the propulsion stage 200 from the remainder of the projectile. Inflation of the airbags may be accomplished via pressurized gas containers coupled to the deflated airbags 202 and communicatively coupled to a controller, such as the controller 70 (FIG. 2), or any other suitable control system. Note that the deployable airbags 202 may also be utilized in conjunction with or in place of pyrotechnic actuators or other explosives, also for separating the propulsion stage 200.

Mounting airbags 202 at the aft or rear end 212 of the lower propulsion stage 200 allows the propulsion stage 200 to be rapidly pulled or dragged substantially axially away from the remainder of the projectile, thereby enabling safer and faster separation of the propulsion stage 200. In this way, aerodynamic instability and tumbling of the propulsion stage 200 is mitigated, thus reducing the amount of reflection of plume and thrust from secondary stages reflecting off the lower propulsion stage 200 and back at the secondary stages, as well as reducing disruption of the aero-flow field and potential damage to secondary stage nozzles and associated actuation systems. Moreover, additional thrust vector controls or a more substantial guidance system are often included in projectiles to compensate for difficult separation fields. Therefore reduction in the disruption of the aero-flow field may allow for omission of the additional thrust vector controls or for inclusion of a less substantial guidance system, thereby allowing for a reduction in weight of the associated projectile.

Figure 10:
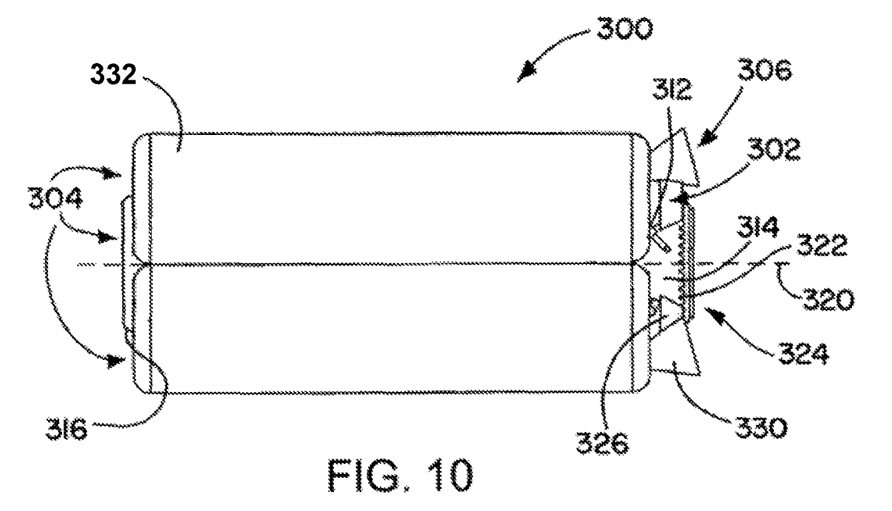
FIG. 10 is a side view of still another exemplary propulsion stage of a projectile.
Figure 11:
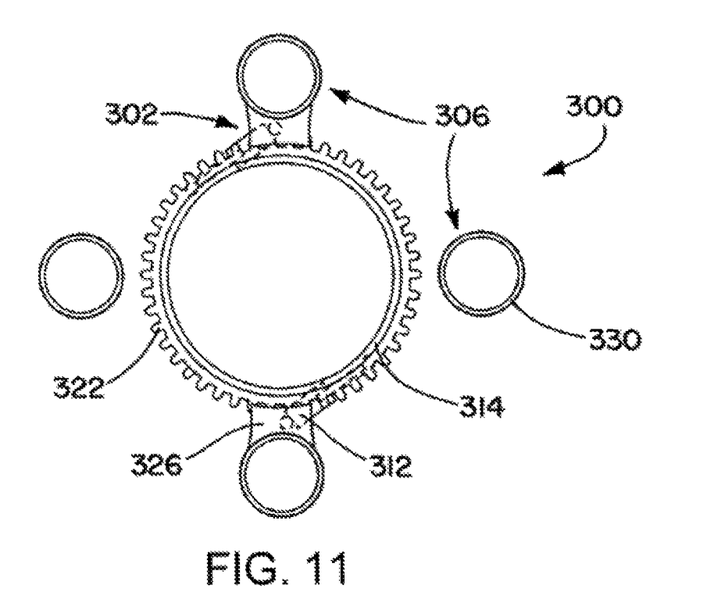
FIG. 11 is a partial rear view of the propulsion stage of FIG. 10.

Turning now to FIGS. 10 and 11, yet another exemplary lower propulsion stage 300 is shown, which includes a nozzle adjusting system 302 coupled to a plurality of boosters 304 and to a plurality of nozzles 306 for maneuvering at least one of the plurality of nozzles 306. The propulsion stage 300 may be used in place of the lower propulsion stages 46 (FIG. 2), 146 (FIG. 6), or 200 (FIG. 9), and the discussion below omits many features of the lower propulsion stage 300 that are similar to those of the lower propulsion stages 46, 146, and 200. In addition, features of the lower propulsion stage 300 may be combined with those of the lower propulsion stages 46, 146, and 200.

The adjusting system 302 includes one or more actuators 312, such as piston-cylinder assemblies, for maneuvering a central nozzle 314 mounted to the central booster 316. The maneuvering may include angling or rotating the nozzle 314. The nozzle may be angled or rotated where the nozzle 314 is attached to the central booster 316 via a ball joint or ring joint (not shown), or via another suitable connection. A pinion gear ring 322 is located at the aft end 324 of the central booster 316 and is engaged with linkages 326, such as with teeth or grooves (not shown) of the linkages 326. The linkages 326 are mounted to a pair of peripheral nozzles 330, also for being maneuvered by the adjusting system 302. The peripheral nozzles 330 are coupled to respective boosters 304, such as non-axisymmetric boosters 332, via hinged or gimbaled couplings (not shown). Further, the linkages 326 may be mounted to any suitable number of peripheral nozzles 330.

Upon exit from the launcher and ignition of the propellant in the central booster 316, maneuvering of the central nozzle 314 may be accomplished via the actuators 312 of the actuating system 302. Next, upon burnout or exhaustion of the propellant internal to the central booster 316, the propellant in the peripheral non-axisymmetric boosters 332 will be ignited. The actuators 312 are power by batteries (not shown) and may be utilized to control maneuvering of the peripheral nozzles 330. In this manner, separate actuators and batteries are not required to maneuver each of the central nozzle 314 and the peripheral nozzles 330.

Upon rotation of the central nozzle 314 via the actuators 312, causing rotation of the pinion gear ring 322 engaged with the linkages 326, the peripheral nozzles 330 are positioned, thus enabling maneuvering of the associated projectile. Alternatively, upon angling of the central nozzle 314 via the actuators 312, the peripheral nozzles 330 are similarly angled due to attachment to the central nozzle 314 via the linkages 326. Particularly, upon movement of the linkages 326, each peripheral nozzle 330 of the pair of peripheral nozzles 330 is tilted or rotated in the same direction, redirecting the thrust from the nozzles 330, and allowing redirection of the projectile.

Alternatively, the maneuvering of the central nozzle 314 may include where the nozzle 314 is axially extended away from the propulsion stage 300 along a central longitudinal axis 320. The nozzle 314 may be axially extended where the nozzle 314 is a telescoping nozzle or where the nozzle 314 includes a telescoping coupling coupled between the nozzle 314 and the central booster 316. In this way, extension of the nozzle 314 causes extension of the peripheral nozzles 330 due to interconnection of the nozzles via the linkages 326.

Figure 12:
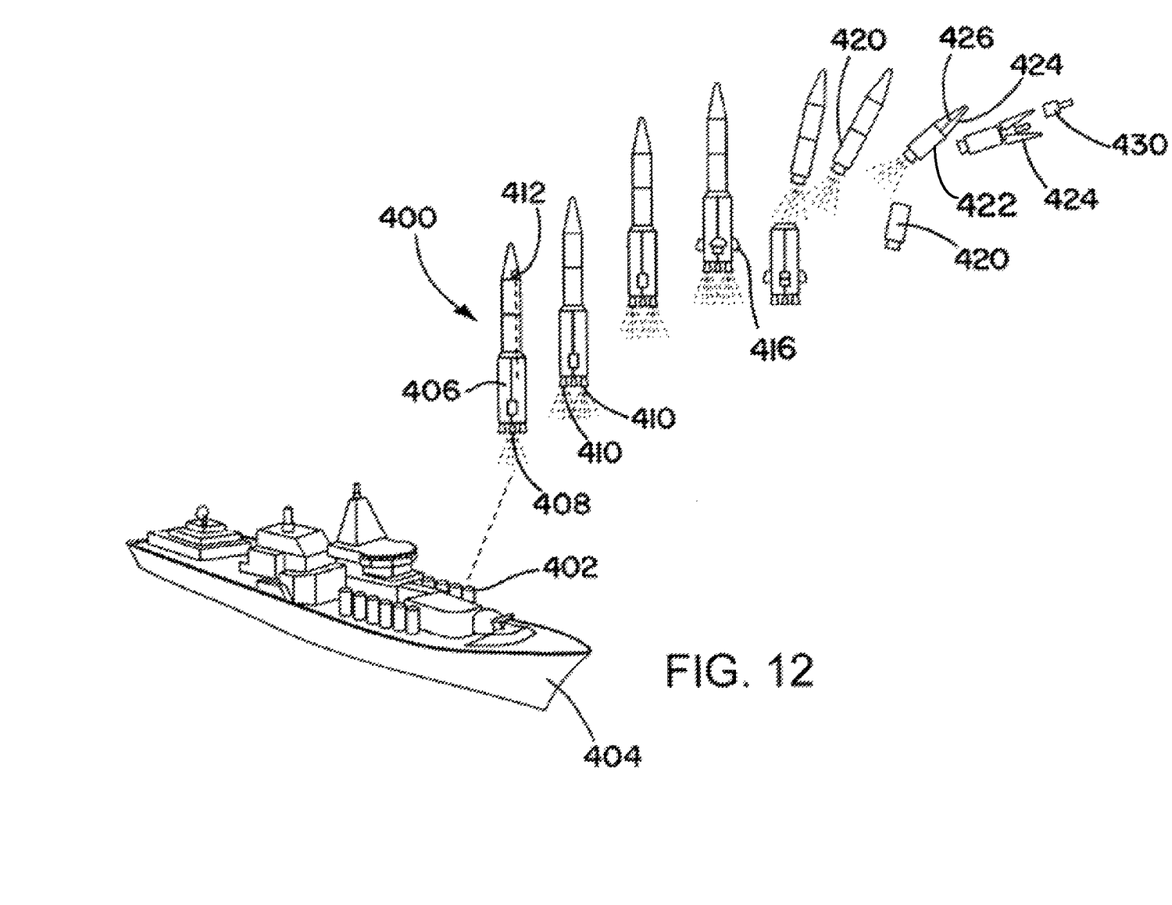
FIG. 12 is an illustration of a flight sequence of another exemplary projectile.

Turning now to FIG. 12, another exemplary projectile 400 is shown in a launch sequence illustrating its launch from a launcher 402 of a vehicle, such as a ship 404. The projectile 400 includes lower propulsion stage 406, which may be used in place of the lower propulsion stages 46 (FIG. 2), 146 (FIG. 6), 200 (FIG. 9), or 300 (FIG. 10), and the discussion below omits many features of the lower propulsion stage 406 that are similar to those of the lower propulsion stages 46, 146, 200, and 300. In addition, features of the lower propulsion stage 406 may be combined with those of the lower propulsion stages 46, 146, 200, and 300.

The lower propulsion stage 406 has a central booster 408 and four peripheral non-axisymmetric boosters 410 surrounding the central booster 408. Upon ignition of the propellant in the central booster 408, the projectile 400 exits its associated launch canister (not shown) and the launcher 402. The ignition is accomplished via communication with a control system, such as a controller 412.

After the projectile 400 exits from the launcher 402, the propellant in the peripheral boosters 410 is ignited, thereby enabling propulsion of the projectile 400 to a designated position away from the ship 404 and towards a designated target. Particularly, this propellant is ignited prior to exhaustion of the propellant in the central booster 408, thereby reducing the effect of gravity on the projectile 400 during any period where no propellant is burning.

The peripheral boosters 410 are also each ignited at substantially the same time. In this way, pressure loads inside the boosters 410, and on each side of shared or abutting planar wall portions of the boosters 410, substantially cancel each other out. This pressure balancing keeps any one booster 410, and particularly a booster wall of any booster 410, from collapsing and causing the projectile 400 to become symmetrically unbalanced.

To further ensure ignition of each of the peripheral boosters 410 at substantially the same time, the boosters 410 may include a time barrier coating over the external surface of the propellant inside the boosters 410. The coating may be a thin coating that slows initial combustion of the propellant by requiring the coating to be burned through prior to ignition of the propellant. The resultant gradual ignition of the propellant may allow pressure between adjacent boosters 410 to be equalized. Thus the coating may reduce the effect of non-simultaneity in ignition of the propellant in each of the boosters 410 relative to one another, such as an effect of collapse of one of the booster walls of one of the boosters 410. The coating may also be of any suitable thickness.

Upon exhaustion of the propellant, or just prior to exhaustion of the propellant, in the non-axisymmetric boosters 410, deployable airbags 416 are inflated, thereby enabling the lower propulsion stage 406 to separate from the remainder of the projectile 400. Alternatively, the airbags 416 may not be deployed until after interstage separation occurs, where adjacent propulsion stages are separated, such as by initiation of pyrotechnic explosives located between the flange of one propulsion stage and the booster outer wall of an adjacent propulsion stage.

Thereafter, the propellant in an intermediate propulsion stage 420 is ignited, moving the projectile 400 further towards the designated target. Upon exhaustion of this propellant, the intermediate propulsion stage 420 is separated from the remainder of the projectile 400 via pyrotechnic explosives (not shown). After that, the propellant in an upper propulsion stage 422 is ignited, moving the projectile 400 even further towards the designated target. Alternatively, the intermediate stage 420 may be separated from the remainder of the projectile 400 via deployable airbags instead of or in addition to the pyrotechnic explosives.

As propellant is exhausted, a nosecone 424 is separated at a split line 426, via additional pyrotechnic explosives (not shown), allowing for exit of a flight vehicle 430 towards the designated target along a final target vector. Alternatively, the flight vehicle 430 may be released at any stage of the launch sequence referenced herein.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A projectile for firing from a launcher, the projectile comprising:
    a propulsion stage having a plurality of boosters arranged about a longitudinal axis of the propulsion stage, wherein at least one booster of the plurality of boosters is non-axisymmetric;
    further including a binding material jointly wrapped about the plurality of boosters and providing radially inwardly directed structural support to each of the boosters of the plurality of boosters; and
    further including a central booster about which the plurality of boosters are arranged.

2. The projectile of claim 1, wherein the central booster is axisymmetric.

3. The projectile of claim 1,
    wherein the plurality of boosters each have a booster outer wall; and
    wherein the booster outer walls each include an arcuate wall portion of the respective booster outer wall corresponding to a curvature of the central booster.

4. The projectile of claim 1,
    wherein each booster of the plurality of boosters is non-axisymmetric;
    wherein the non-axisymmetric boosters each have a booster outer wall;
    wherein the booster outer walls each include a planar wall portion; and
    wherein the non-axisymmetric boosters abut one another at the planar wall portions.

5. The projectile of claim 1, as part of a projectile system,
    wherein the projectile system also includes a projectile outer launch canister; and
    wherein the projectile is at least partially interior to the projectile outer launch canister.

6. The projectile of claim 1, at least one of the boosters of the plurality of boosters includes a longitudinally extending portion made of a flexible material.

7. The projectile of claim 6, wherein the binding material compressively restrains the plurality of boosters effecting compression of the at least one of the boosters of the plurality of boosters having a flexible material towards the other boosters of the plurality of boosters thereby effecting the non-axisymmetry.

8. A projectile propulsion stage comprising:
contiguous boosters arranged about a longitudinal axis of the propulsion stage; and
a binding material wrapped about the contiguous boosters;
wherein at least one of the contiguous boosters is non-axisym metric;
wherein the contiguous boosters include an axisymmetric primary booster and non-axisymmetric boosters arranged about the primary booster;
wherein each of the non-axisym metric boosters has two substantially planar surfaces; and
wherein each of the non-axisym metric boosters is operatively coupled to adjacent of the non-axisymmetric boosters at the substantially planar surfaces.

9. The projectile propulsion stage of claim 8, wherein longitudinally-extending portions of each of the contiguous boosters are integral parts of a unitary body of boosters.

10. The projectile propulsion stage of claim 8, wherein longitudinally-extending portions of each of the contiguous boosters are continuous edgeless tubes.

11. The projectile propulsion stage of claim 8,
wherein the contiguous boosters define a central cavity therebetween; and
further including structural reinforcement material filling most of the cavity.

12. The projectile propulsion stage of claim 8,
wherein the primary booster is substantially cylindrical; and
wherein each of the non-axisym metric boosters has a concave curved surface corresponding to and contiguous with the substantially cylindrical primary booster.

13. The projectile propulsion stage of claim 8, wherein four non-axisym metric boosters are arranged about the longitudinal axis.

14. The projectile propulsion stage of claim 8, wherein the propulsion stage further includes deployable airbags each mounted between two of the contiguous boosters.

15. The projectile propulsion stage of claim 8, further comprising:
nozzles; and
an actuation system operatively coupled to one nozzle for moving the one nozzle; and
wherein the one nozzle is further operatively coupled to additional nozzles for moving the additional nozzles.

16. The projectile propulsion stage of claim 8,
wherein the primary booster and the non-axisym metric boosters define cavities therebetween; and
further including structural reinforcement material filling most of each of the cavities.

17. The projectile of claim 8, wherein the non-axisymmetry of the at least one of the contiguous boosters is effected via compressive force caused by the binding material wrapped about the contiguous boosters.

18. A method of deploying a projectile from a launcher, the method comprising the steps of:
igniting a propellant in a central booster of the projectile, thereby enabling egress of the projectile from the launcher;
igniting a propellant in non-axisymmetric peripheral boosters of the projectile abutting the central booster prior to exhaustion of the propellant in the central booster, thereby enabling propulsion of the projectile away from the launcher towards a target; and
radially-outwardly deploying outer inflatable airbags circumferentially spaced about the projectile, thereby effecting drag at an outer surface of a propulsion stage including the central booster, non-axisymmetric peripheral boosters, and airbags, to enable the propulsion stage to separate from a remainder of the projectile.

19. The method of claim 18, wherein the inflatable airbags are mounted at locations between non-axisymmetric peripheral boosters.

* * * * *